United States Patent [19]

Flanagan et al.

[11] 4,449,190
[45] May 15, 1984

[54] SILENCE EDITING SPEECH PROCESSOR

[75] Inventors: James L. Flanagan, Warren; James D. Johnston, Millington, both of N.J.

[73] Assignee: Bell Telephone Laboratories, Incorporated, Murray Hill, N.J.

[21] Appl. No.: 343,238

[22] Filed: Jan. 27, 1982

[51] Int. Cl.[3] .............................................. G10L 1/00
[52] U.S. Cl. .................................. 364/513.5; 381/46; 381/106; 375/122
[58] Field of Search ............. 364/513.5, 200 MS File, 364/900 MS File; 381/29-35, 46, 106; 375/122

[56] References Cited

U.S. PATENT DOCUMENTS

| | | | |
|---|---|---|---|
| 4,053,712 | 10/1977 | Reindl | 179/15.55 |
| 4,272,810 | 6/1981 | Gates et al. | 179/1 |
| 4,280,192 | 7/1981 | Moll | 179/1 |

OTHER PUBLICATIONS

Boddie, et al, "Adaptive Differential PCM Coding", The Bell System Technical Journal, vol. 60, No. 7, Sep. 1981, pp. 1547-1561.

Primary Examiner—E. S. Matt Kemeny
Attorney, Agent, or Firm—Jack S. Cubert

[57] ABSTRACT

In an ADPCM system, improved detection of silence intervals in a speech signal is attained by detecting the level of the logarithm step-size signal ($d_n$), which is representative of the energy of the speech samples. A speech pattern is converted into a sequence of adaptive digital codes. Intervals of silence in the pattern are detected and a digital code representative of each silence interval is generated. The adaptive digital codes and the silence interval codes are combined to form a digitally coded signal representative of the pattern. The conversion of the pattern to adaptive digital codes includes forming a signal corresponding to the adaptation step-size for each digital code. The silence interval detection includes producing first and second threshold signals. A silence interval signal is initiated when the adaptation step-size corresponding signal diminishes below the first threshold and the silence interval is terminated when the adaptation step-size corresponding signal increases above the second threshold after the silence interval initiation.

15 Claims, 11 Drawing Figures

SILENCE DETECTOR

SILENCE COUNTER

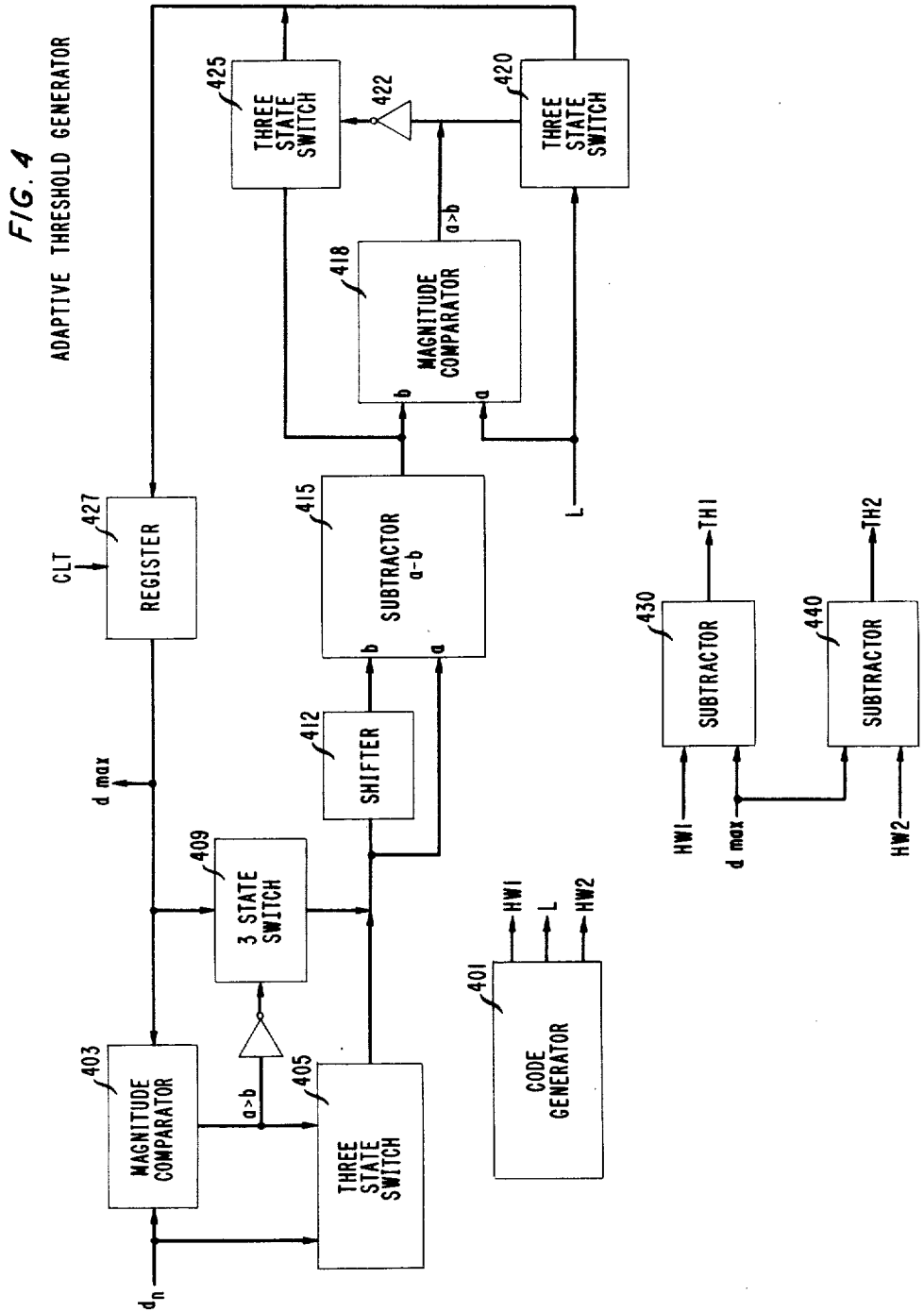
FIG. 4 ADAPTIVE THRESHOLD GENERATOR

CODE MODIFIER

SILENCE CODE DETECTOR & COUNTER

CODER

CODES WAVEFORMS

DECODER WAVEFORMS

SILENCE EDITING SPEECH PROCESSOR

TECHNICAL FIELD

Our invention relates to speech processing and, more particularly, to speech signal coding arrangements.

BACKGROUND OF THE INVENTION

As is well known, normal speech contains silent intervals which form part of the intelligence that is conveyed. Periods of silence occur between sentences, phrases, words and within words. Ordinarily, silent intervals are accepted by the listener as natural attributes of speech. The silence, however, accounts for a significant portion of the speech pattern. When a speech signal is coded for transmission over a communication channel or for storage in memory, the code sequences corresponding to silence occupy segments of the coded signal which can be eliminated or utilized for other purposes. It is, of course, necessary to reproduce the silence intervals in their proper locations in the speech pattern to understand the message. But the coding for silence can be simplified so that the stored or transmitted digital signal is made more compact. In this way, the efficiency of the communication system is increased.

Many schemes are available for digitally coding speech signals. Direct conversion of sampled speech to binary form may be accomplished by pulse code modulation. The conversion process includes quantizing each speech sample to one of a set of discrete levels and coding the selected quantized level. Adaptive forms of pulse modulation in which the quantization of the speech signal samples is adapted to the level of the input signal provides improved performance with fewer bits per digital sample. In such adaptive arrangements, the step-size in the quantizer is permitted to vary so as to match the statistical characteristics of the input signal. Differential pulse modulation systems encode the difference between input signal samples rather than the samples themselves to improve coding efficiency. These coding arrangements, however, do not accurately distinguish between active and inactive portions of the input signal. Consequently, the silence periods in the signal adversely affect the efficiency of intelligence transmission.

U.S. Pat. No. 4,280,192 issued to E. W. Moll on July 21, 1981, discloses an arrangement to minimize the space for digital storage of analog information in which an input analog signal such as speech is converted into a stream of continuously variable slope delta modulation (ADM) codes. A voice operated switch detects the beginning of a pause interval when the analog signal falls below a predetermined level. The pause is timed by a counter which is stopped when the speech signal rises above a predetermined level. A special pause code including timing information is then inserted into the digital code stream. The voice operated switch and the timing arrangements remove repetitive codes of the pause intervals of the analog signal.

Voice operated switches, as is well known in the art, are designed to operate at a low rate to prevent syllable clipping and include apparatus that inhibits the detection of short silent intervals. Consequently, the Moll system utilizes a compensating delay to facilitate the insertion of pause codes in their proper locations in the data stream. But the delay inherent in the voice operated switch makes it difficult to detect short periods of silence that occur at higher than word rate.

U.S. Pat. No. 4,053,712 issued to A. Reindl on Oct. 11, 1977, discloses an adaptive digital coder decoder in which special coded bit patterns are substituted for idle patterns in a CVSD output bit stream to reduce the overall bit rate. Idle pattern detection is accomplished by converting the CVSD output to an analog signal and comparing the analog signal to fixed amplitude thresholds. The regeneration of the analog speech signal to detect silence requires an additional decoder arrangement that adds to the cost of the coding. While direct amplitude thresholds make the arrangement relatively free from rate restriction in silence detection, there is increased sensitivity to noise. As a result, it is difficult to distinguish fricatives from silence and the arrangement is more susceptible to speech clipping. It is an object of the invention to provide improved digital coding adapted to economically eliminate silence intervals without rate restriction.

BRIEF SUMMARY OF THE INVENTION

The problems of the prior art silence elimination schemes are overcome in accordance with our invention by utilizing step-size related signals already produced in adaptive pulse modulation schemes to detect silence intervals. These step-size related signals are representative of the energy content of the applied speech signal but are not affected by the delay mechanisms present in voice operated switches. As a result, analog signal processing is eliminated, detection of silence intervals is not limited to predetermined rates, and arrangements to properly locate the silence interval codes are rendered unnecessary.

Our invention is directed to a speech processing arrangement in which a speech pattern is converted into a sequence of adaptive digital codes. Intervals of silence in the pattern are detected, and a digital code representative of each silence interval is generated. The adaptive digital codes and the silence interval codes are combined to form a digital signal representative of the speech pattern. The conversion of the pattern to adaptive digital codes includes forming a signal corresponding to the adaptation step-size for each digital code. First and second threshold signals are produced. The silence interval detection includes generating a silence interval signal when the adaptation step-size corresponding signal diminishes below the first threshold and terminating the silence interval signal when the adaptation step-size related signal increases above the second threshold during a silence interval.

DESCRIPTION OF THE DRAWING

FIG. 4 depicts a detailed block diagram of an adaptive threshold generator useful in the circuit of FIG. 1;

DETAILED DESCRIPTION

Figure 1:
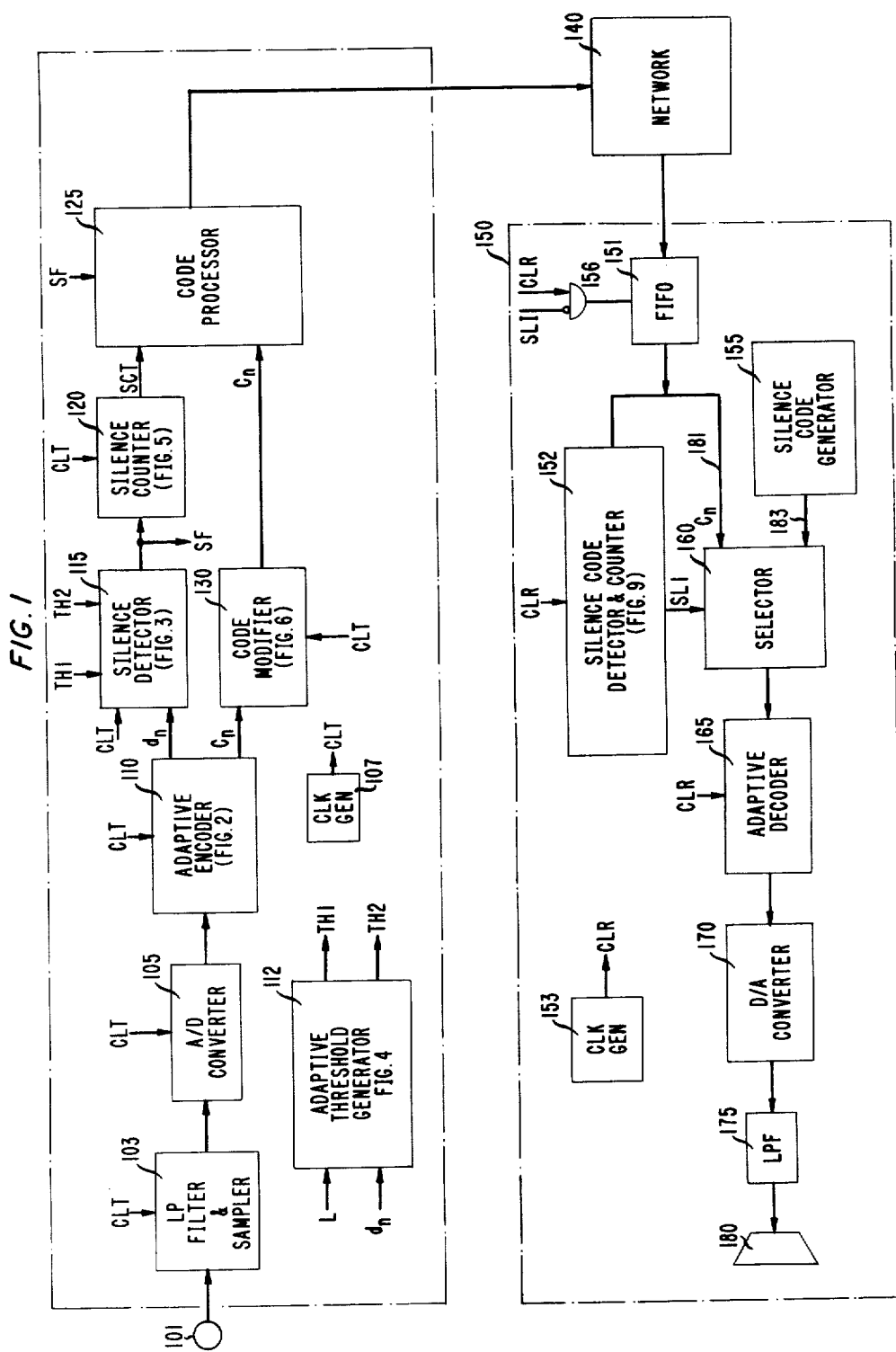
FIG. 1 depicts a block diagram of a digital voice communication circuit illustrative of the invention.

FIG. 1 shows a digital voice communication arrangement illustrative of the invention. Referring to FIG. 1, a speech pattern is applied to microphone 101 and the speech signal obtained therefrom is supplied to low-pass filter and sampler circuit 103. Circuit 103 is operative, as is well known in the art, to low-pass filter the applied speech signal and to sample the filtered signal at a predetermined rate of clock generator 107. The cutoff frequency of the low-pass filter may, for example, be 3.2 Khz and the sampling rate may, for example, be 8 Khz. The sequence of speech samples from circuit 103 are representative of the waveform of the speech signal.

Analog-to-digital converter 105 receives the successive speech samples from circuit 103 and converts each speech sample into a digitally coded signal having a value corresponding to the amplitude of the speech sample. The digital coded signals from converter 105 are supplied to the input of adaptive encoder 110. As is well known in the art, an adaptive encoder is operative to transform a digital signal from converter 105 into a more efficiently coded signal having improved signal to noise characteristics.

Figure 2:
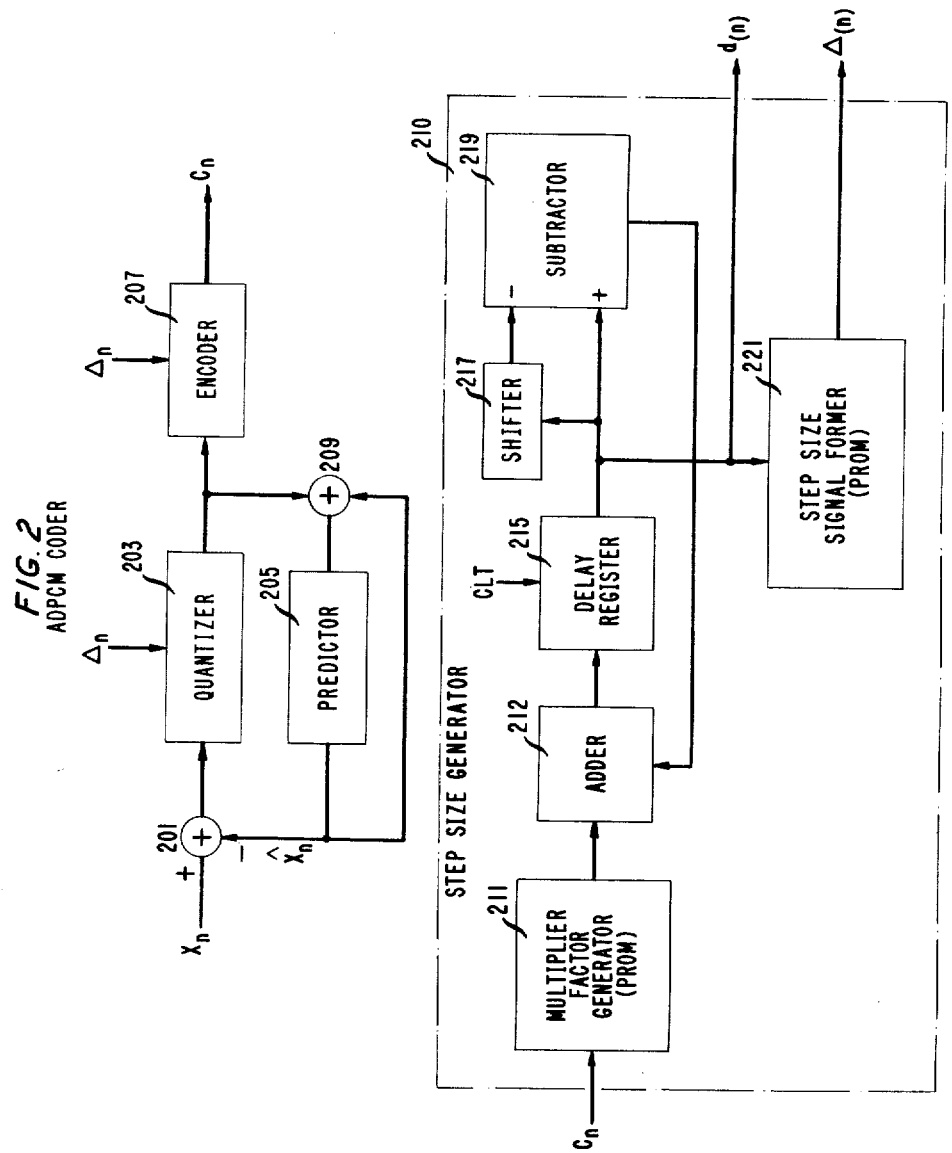
FIG. 2 depicts a detailed block diagram of an adaptive encoder useful in the circuit of FIG. 1.

One type of adaptive encoder which may be utilized in the circuit of FIG. 1 is shown in the logic diagram of FIG. 2. FIG. 2 is illustrative of an adaptive differential pulse code modulation (ADPCM) coder. It is to be understood that other forms of adaptive code modulators may be used. In differential pulse code modulation, the difference between each sample $x_n$ and a prediction of said sample ($\hat{x}_n$) based on past samples is quantized and coded for transmission. By using a number of quantizer levels, a staircase approximation to the speech signal is produced. In differential coding, sufficient redundancy is removed from the signal so that a bit rate saving of two bits per sample over conventional PCM coding can be obtained.

Generally, differential coding utilizes a fixed quantizer step-size. An adaptive arrangement includes apparatus to monitor the digital output of the coder. Responsive to the magnitude of the difference signals at the output, the effective step-size of the quantizer is modified. In this manner, the quantization of the input signal is optimized.

Referring to FIG. 2, the sequence of digital signals $x_n$ from A to D converter circuit 105 is supplied to one input of Adder 201. The other input of the Adder receives a predicted estimate of the current digital signal $x_n$ based on the sequence of preceding signals $x_{n-1}$, $x_{n-2}$, .... The difference between current signal $x_n$ and predicted signal $\hat{x}_n$ appears at the output of Adder 201 and is supplied to quantizer 203. The quantizer is operative to compare the difference signal from Adder 201 to a prescribed set of quantizer levels and to produce a signal corresponding to the nearest quantizer level. The quantized difference signal appearing at the output of quantizer 203 is applied to encoder 207 which is adapted to form a digital code $C_n$ corresponding to the supplied quantizer level.

The output of encoder 207 is a sequence of digital codes representing the quantized difference between the speech signal samples and the predictive values thereof. The quantized difference signal at the output of quantizer 203 is also applied to one input of Adder 209 in which it is summed with the predicted sample value obtained from predictor 205. The sum signal from Adder circuit 209 is supplied to the input of predictor 205. Consequently, the output of the predictor is updated to be representative of the predicted value of the next speech sample signal $x_{n+1}$.

Step-size generator circuit 210 receives the encoder output codes $C_n$ and responsive thereto supplies a step-size signal $\Delta_n$ to adjust the levels in quantizer 203 in accordance with the relative amplitude of $C_n$. When $C_n$ is large, the step-size signal $\Delta_n$ is effective to expand the step-sizes in quantizer 203 whereby the quantizer accommodates the high amplitude signal. Low values of $C_n$ result in step-sizes that contract the quantizer to accommodate the low amplitude signals. In this way, the quantizer is adapted to the expected level of the input signal. The construction and use of adaptive and differential encoders is discussed in the book *Digital Processing of Speech Signals* by L. R. Rabiner and R. W. Schafer published by Prentice Hall, Inc., Englewood Cliffs, N.J., and copyrighted by Bell Telephone Laboratories, Incorporated, 1978.

Alternatively, adaptive encoder 110 may comprise a microprocessor such as the Motorola type 68000 described in the *MC68000 Design Module User's Guide*, Motorola, Inc., 1980 operating in accordance with a predetermined set of instructions stored in a read-only memory. Appendix A hereto lists the permanently stored instructions needed to ADPCM encode signals from A/D converter 105 in FORTRAN langauge.

Step-size generator 210 in FIG. 2 is operative in accordance with $$d_n = \beta d_{n-1} + mC_n \qquad (1)$$

to form a signal $d_n$ corresponding to the logarithm of the step-size responsive to the last output of encoder 207 ($C_{n-1}$). $\beta$ is a constant related to the dissipation of errors and is, for example, $$\beta = 1 - 2^{-6} \qquad (2)$$

$d_{n-1}$ is the preceding logarithmic step-size signal and m is a multiplier factor for adjusting the step-size magnitude related to the expected dynamic range of the signal and the number of quantizer levels.

In FIG. 2, digital coded signal $C_n$ is applied to the address input of multiplier factor generator 211 which may comprise a programmable read-only memory (PROM) well known in the art that is adapted to provide a preassigned output $mC_n$ for each digital code input $C_n$ applied to the address inputs thereof.

$$m = \log_Q M \qquad (3)$$

where 0.85 for the lowest 4 levels
1.2 for levels 5 and 6
M =
    1.6 for level 7 2.4 for level 8, and
$Q = D^{1/s}$.

D is the dynamic range of the input signal $x_n$ and s is the number of step-sizes.

Delay register 215 holds the preceding logarithmic step-size signal $d_{n-1}$. Responsive to the clock signal CLT from clock generator 107 for the nth input, signal $d_{n-1}$ is supplied to shifter 217 and to one input of subtractor 219. Shifter 217 shifts coded signal $d_{n-1}$ six places to the right to form the signal $2^{-6}d_{n-1}$ and may comprise a wiring arrangement to reassign the coded signal bits.

Subtractor 219 receives signal $d_{n-1}$ from register 215 and signal $2^{-6}d_{n-1}$ from shifter 217 and is operative to produce difference signal $(1-2^{-6})d_{n-1}$. The output of subtractor 219 is summed with signals $mC_n$ in Adder 212 and the resulting $d_n$ signal is placed in register 215 by clock pulse CLT. Signal $d_n$ in register 215 is representative of the logarithm of the coder step-size $\Delta_n$ supplied to quantizer 203. In order to form the $\Delta_n$ signal, the digital code $d_n$ is applied to the address inputs of step-size signal former 221. Former 221 is a programmable read-only memory (PROM) in which a table relating $d_n$ to $\Delta_n$ is stored. For each $d_n$ address input, the corresponding $\Delta_n$ step-size signal is supplied to the outputs of the PROM.

The logarithmic step-size signal $d_n$ is representative of the energy of the sequence of speech samples $x_n$ and may be used to determine silence intervals in the speech signal. In contrast to the voice operated switches and other speech present signal detectors, the logarithmic step-size signal changes at much higher than syllabic rates without introducing noise or speech clipping into the resulting coded speech signal. Consequently, the detection of silence intervals responsive to changes in the logarithmic step-size signal is achieved in accordance with the invention substantially without rate restriction.

Figure 3:
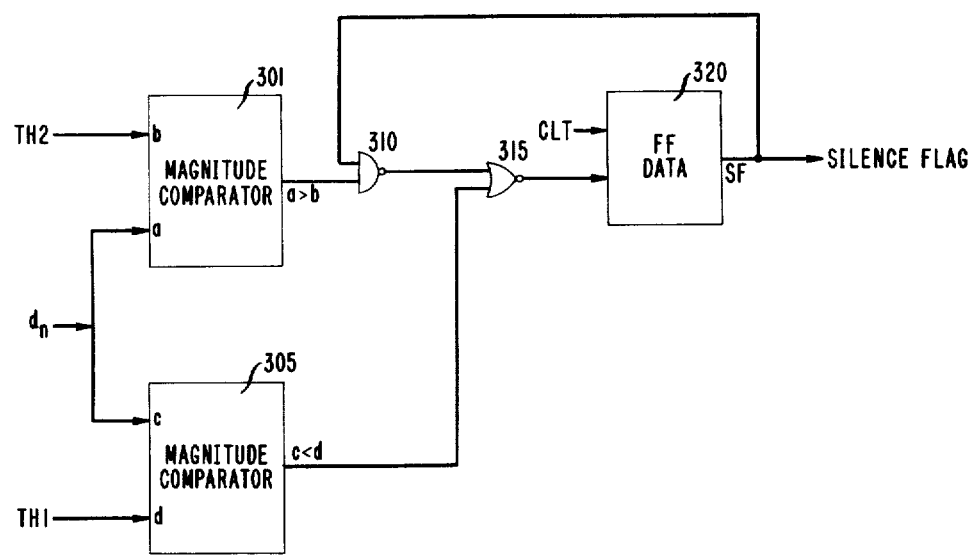
FIG. 3 depicts a detailed block diagram of a silence detector useful in the circuit of FIG. 1.

Silence detection is performed in silence detector 115 shown in greater detail in FIG. 3. Referring to FIG. 3, signal $d_n$ from adaptive encoder 110 is applied to the a input of magnitude comparator 301 and the c input of magnitude comparator 305. Comparator 305 is enabled when the $d_n$ signal diminishes below threshold level signal TH1. The enabled output of comparator 305 sets flip-flop 320 via OR-gate 315. When set, flip-flop 320 provides an enabled SF signal indicating that a silence interval has started. Signal SF alerts AND-gate 310 to which the output of comparator 301 is supplied. Threshold signal TH2 applied to the B input of comparator 301 corresponds to the speech onset level. When signal $d_n$ exceeds threshold signal TH2, comparator 301 is enabled. Flip-flop 320 is reset via AND-gate 310 and OR-gate 315 only if logarithmic step-size signal $d_n$ increases above threshold TH2 during a silence interval.

Threshold signals TH1 and TH2 may be fixed voltage levels if the dynamic range of the input speech signal is preset by a signal compressor connected between microphone 101 and filter and sampler circuit 103 in FIG. 1. Such a compression arrangement, however, alters the speech signal so that the voice characteristics of the speaker becomes unnatural. Consequently, the recovered speech pattern may not sound like the speaker. In accordance with the invention, the speech signal compressor normally employed is eliminated through the use of an adaptive threshold generator 112 of FIG. 1. The adaptive threshold generator modifies threshold signals TH1 and TH2 responsive to the logarithmic step-size signal whereby the speaker's voice characteristics are not changed by the apparatus required for silence elimination.

Adaptive threshold generator 112 is shown in greater detail in FIG. 4. Referring to FIG. 4, level generator 401 produces preset limit signal L corresponding to the lowest anticipated logarithmic step-size signal consistent with active speech input to the circuit of FIG. 1 and preset level signals HW1 and HW2 corresponding to the normally expected difference between $d_{max}$ and the silence threshold values. $d_{max}$ is, in general, the maximum in the sequence of $d_n$ signals from adaptive encoder 110. Register 427 is initially set to L and stores the maximum of the logarithmic step-size signals up to sample $x_{n-1}$. The $d_{max}$ signal from register 427 is compacted to the current logarithmic step-size signal $d_n$ in magnitude comparator 403. The comparator is enabled if $d_n$ is greater than $d_{max}$. The enabling signal from comparator 403 causes three state switch 409 to open and three state switch 405 to close whereby the $d_n$ greater than $d_{max}$ signal is supplied to the a input of subtractor 415 and to shifter 412. In the event signal $d_{max}$ is greater than signal $d_n$, comparator 403 remains disabled and the $d_{max}$ signal from register 427 passes through three state switch 409 and is supplied to the a input of subtractor 415 and to the input of shifter 412.

Shifter 412 is operative to shift the input thereto ten places to the right and subtractor 415 provides the signal $$d_{max}(1-2^{-10})$$

to the b input of comparator 418 and the input of three way switch 425. Comparator 418 is enabled if the L limit signal applied thereto is greater than the output of subtractor 415. In that event, three state switch 420 is turned on and limit signal L is placed in register 427. If the output of subtractor 415 is less than limit signal L, comparator 418 remains disabled. Three state switch 425 is turned on and register 427 receives the maximum of the logarithmic step-size signals up to and including logarithmic step-size signal $d_n$.

Signal $d_{max}$ from register 427 is supplied to subtractor 430 which is operative to form the signal $d_{max}-HW1$. This threshold level is modified in accordance with the maximum logarithmic step-size signal $d_{max}$ so that the silence threshold is adaptively varied. Subtractor 440 forms the signal $TH2=d_{max}-HW2$, and the speech onset threshold is adaptively varied responsive to the maximum logarithmic step-size signal. In this manner, the silence intervals of any speech signal are detected without altering the voice characteristics of the speaker.

Figure 5:
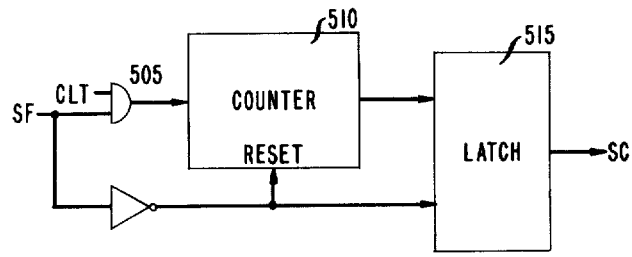
FIG. 5 depicts a detailed block diagram of a silence counter arrangement useful in the circuit of FIG. 1.

The SF output of silence detector 115 is supplied to silence counter 120 shown in greater detail in FIG. 5. Referring to FIG. 5, the SF signal is applied to one input of AND-gate 505 and to the input of inverter 507. During normal speech, signal SF is disabled and the output of inverter 507 presets counter 510 to its zero state. Upon the initiation of a silence interval, signal SF is enabled and the code clock signals CLT pass through AND-gate 505 to the input of counter 510. Counter 510 is incremented until detection of the termination of the silence interval. Latch 515 is enabled at the silence interval termination whereby the silence interval count is transferred from counter 510 into the latch. The silence count SCT from latch 515 is supplied to an input of code processor 125 which also receives the $C_n$ codes generated in adaptive encoder 110 and the SF signal from detector 115.

Code processor 125 is adapted to form a message comprising the combined output codes $C_n$ and silence interval codes and to supply the message to communication network 140 as required. Processor 125 may comprise a microprocessor such as the Motorola type 68000 described in the aforementioned MC68000 *Design Mod-*

*ule User's Guide*, Motorola, Inc., 1980. The code combining arrangements of processor 125 are performed in accordance with a fixed set of instructions stored in a read-only memory (ROM). These instructions are set forth in FORTRAN language in Appendix B hereto.

The silence intervals omitted from the speech signal are represented by a special silence code SC followed by the silence count signal SCT from silence counter 120. In the circuit of FIG. 1, the silence code is selected as the maximum excursion output of the adaptive encoder. For a four bit ADPCM code arrangement, the maximum excursion combination is $87_{16}$. This code is selected because of its low probability of occurrence. In order to avoid false detection of silence intervals, the maximum excursion code occurring in $C_n$ must be replaced. Code modifier circuit 130 of FIG. 1 is operative to replace the 87 code combination by a $96_{16}$ combination so as to minimize the signal distortion.

Figure 6:
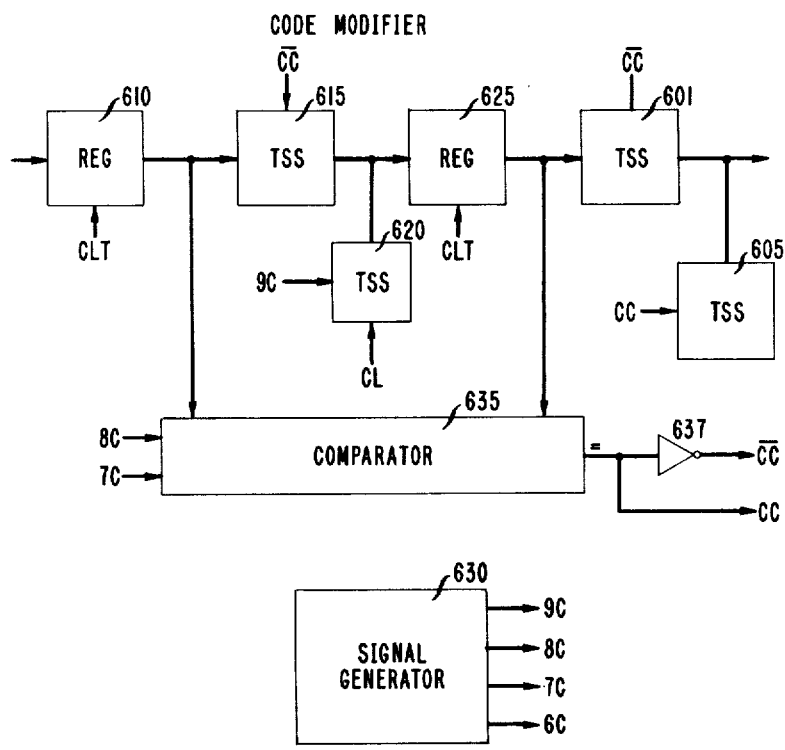
FIG. 6 depicts a detailed block diagram of a code modifier circuit useful in the circuit of FIG. 1.

The code modifier circuit is shown in greater detail in FIG. 6. Referring to FIG. 6, the output of adaptive encoder 110 is supplied to register 610 at each clock pulse CLT. The $C_n$ code in register 610 is normally transferred in turn to register 625 via three-state switch 615, and the $C_{n-1}$ code in register 625 appears at the output of three-state switch 601. The outputs of register 610 and 625 representing the pair of current coder signals are compared in comparator 635 to the coded combination $87_{16}$. These codes are supplied by signal generator 632 as is well known in the art. Upon detection of an $87_{16}$ sequence in registers 610 and 625, the output of comparator 635 is enabled and the output of inverter 637 is disabled. Responsive to disabled signal $\overline{CC}'$, three-state switches 601 and 615 are disabled while three-state switches 605 and 620 are enabled by signal CC. The $9_{16}$ signal from generator 632 is thereby inserted into register 625 and the $6_{16}$ signal from generator 632 is inserted into the data stream via three-state switch 605. The output of code modifier 130 is then altered as required.

Figure 7:
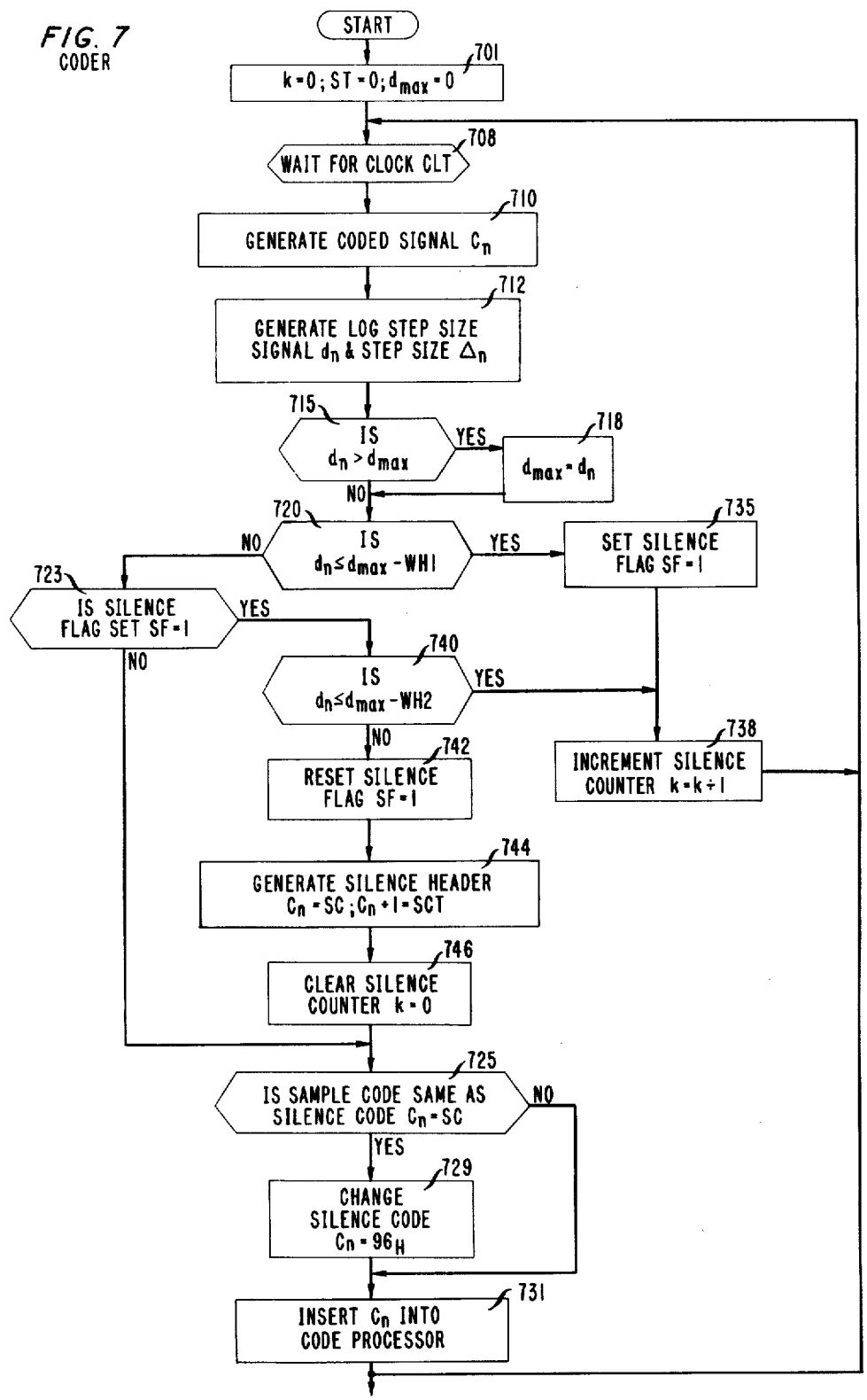
FIGS. 7 and 10 show flow diagrams which illustrate the operation of the circuit of FIG. 1.
Figure 8:
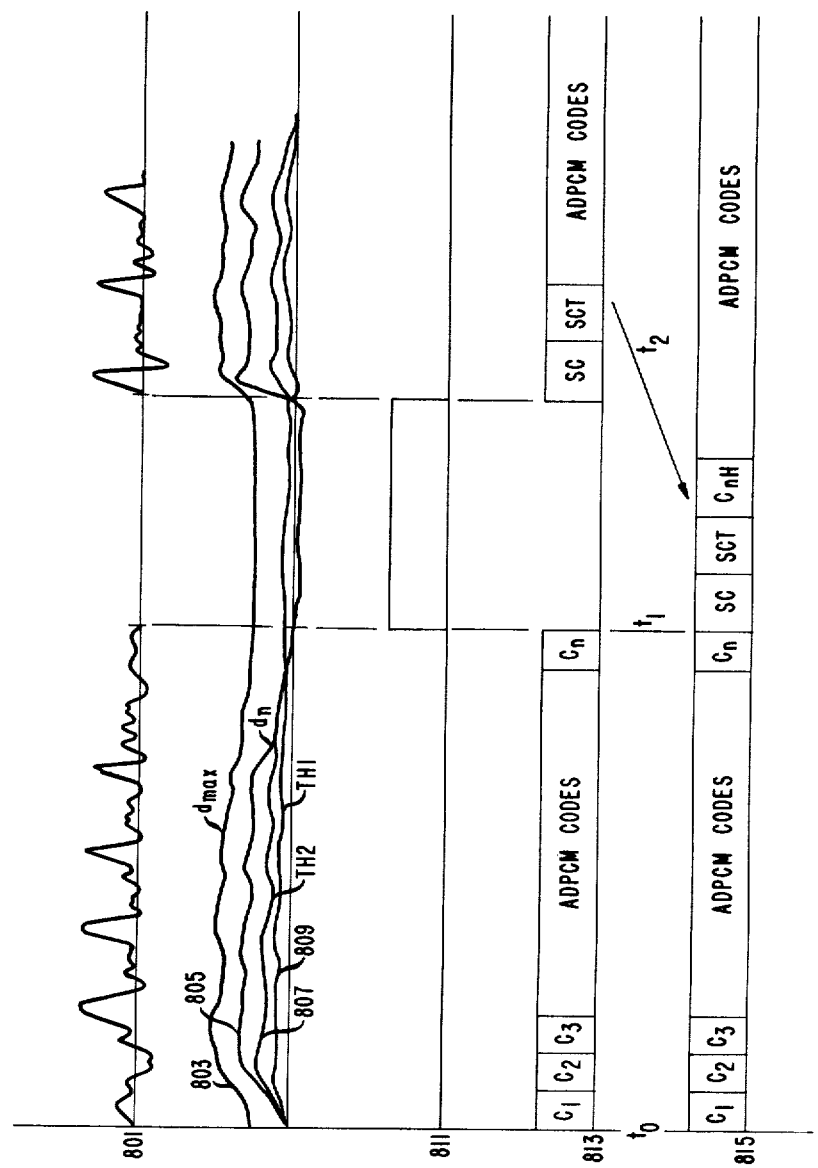
FIGS. 8 and 11 show waveforms that illustrate the operation of the circuit of FIG. 1.

The flow chart of FIG. 7 illustrates the sequence of operations performed in FIG. 1, and the waveforms shown in FIG. 8 illustrate the signals and codes at various points in the circuit of FIG. 1. Prior to receipt of a speech signal at microphone 101, silence counter 120 is reset to its zero state. Signal SF from silence detector 115 is disabled, and the stored maximum logarithmic step-size signal $d_{max}$ in threshold generator 112 is set to zero. These operations are indicated in index box 701. The speech signal indicated between times $t_0$ and $t_1$ on waveform 801 does not correspond to a silence interval. Consequently, the logarithmic step-size signal $d_n$ resulting from the speech waveform (indicated in waveform 805) is greater than the threshold signal TH1 of waveform 809. Silence flag signal SF from silence detector 115 is reset, and the output codes $C_n$ are supplied to code processor 125 via code modifier circuit 130. These codes $C_1, C_2, \ldots C_n$ correspond to normal speech and are indicated in waveform 813.

Referring to FIG. 7, wait box 708 is exited on the occurrence of each code clock pulse CLT. Responsive to the code clock pulse CLT, adaptive encoder 110 forms the next adaptive encoder output signal $C_n$ as indicated in box 710. The log step-size signal $d_n$ and step-size signal $\Delta_n$ are formed in the adaptive encoder according to box 712 and the $d_n$ signal is compared to the $d_{max}$ signal in adaptive threshold generator 112 in accordance with decision box 715. In the event logarithmic step-size signal $d_n$ is greater than $d_{max}$, and $d_{max}$ signal is replaced by the current $d_n$ signal (box 718).

The $d_n$ signal is then tested in silence detector 115 to determine whether it is smaller than or equal to the lower threshold signal from threshold generator 112 (decision box 720). Between time $t_0$ and $t_1$ in FIG. 8, the logarithmic step-size signal (waveform 805) is greater than adaptive threshold signal TH1 (waveform 809), and decision box 723 is entered to determine if the silence flag signal SF has been set. Since the SF signal is not enabled between $t_0$ and $t_1$, box 725 is entered for each CLT clock pulse in this interval. The current coded signal $C_n$ is tested as the silence code SC in code modifier 130 as per decision box 725. In the event coded signal $C_n$ equals the reserved silence code SC, $C_n$ is changed in the modifier logic of circuit 130 (box 729). Otherwise, the unmodified $C_n$ code is placed in code processor 125 for transmission or storage.

When time $t_1$ is reached, the operation of the coder is altered. Coded signals $C_n$, $d_n$, and $\Delta_n$ are generated as indicated in boxes 710 and 712, and the $d_n$ signal is compared to the $d_{max}$ signal stored in adaptive threshold circuit 112 (decision box 715). Signal $d_n$ at time $t_1$, however, is less than adaptive threshold signal TH1 so that silence flat setting box 735 is entered via decision box 720. Signal SF is enabled in silence detector 115, and silence counter 120 is incremented as per box 738. Wait box 708 is then entered to detect clock pulses CL for the next speech signal code.

Between times $t_1$ and $t_2$, logarithmic step-size signal $d_n$ is less than threshold signal TH2. Consequently, silence counter incrementing box 738 is entered via silence flag setting box 735 or decision boxes 723 and 740 so that the silence interval continues to be timed as indicated in box 738. When time $t_2$ is reached, logarithmic step-size signal $d_n$ exceeds speech onset threshold TH2 in decision box 740. Silence flag reset box 742 is activated via the path including decision boxes 720, 723, and 740. The silence interval signal SF in detector 115 is reset to terminate the silence interval. The silence header signals (SC = $87_{16}$) and the silence count signal (SCT) are formed in code processor 125 (box 744) responsive to the resetting of signal SF. The silence counter is then cleared to zero as per box 746. The current $C_n$ code is placed in code processor 125 after the silence code test and modification sequence of boxes 725 and 729 in code modifier circuit 130.

The silence code SC and the silence count SCT are placed in the data stream stored in code processor 125 as indicated in waveform 813 between times $t_2$ and $t_3$. Subsequently, the $C_n$ codes from code modifier 130 are added to the data stream since no further silence interval is detected. The codes of the data stream in processor 125 including the silence and silence count codes are illustrated in waveform 815.

The circuit of FIG. 1 may comprise a voice storage system in which network 140 is a digital processor arranged to store the silence edited codes received from code processor 125. Responsive to the speech signal of waveform 801, the digital code sequence shown in 815 is placed in the processor of network 140. As indicated in waveform 815, the silence interval between times $t_1$ and $t_2$ is replaced by the silence code SC followed by the silence count SCT. In this manner, the storage requirements of network 140 are substantially reduced.

The digital codes from network 140 are applied to decoder 150 which is operative to form a replica of the speech pattern originally supplied to microphone 101 including the silence intervals. In decoder 150, the adaptive digital coded signals are applied to the input of silence code detector and counter 152 and selector circuit 160 through first-in first-out shift register 151. Shift register 151 is operative responsive to clock pulses CLR from generator 153 to apply the sequence of digital coded signals to detector 152 and selector 160. Selector 160 is normally operative to pass codes $C_n$ directly to adaptive decoder 165 for conversion into speech samples. Decoder 165 may comprise an ADPCM decoder of the type described in the article "Adaptive Differential Pulse Code Modulation Coding" by J. R. Boddie et al in the *Bell System Technical Journal*, Vol. 60, No. 7, September 1981. Alternatively, it may comprise a microprocessor such as the aforementioned Motorola Type 68000 operating in accordance with the instructions stored in a read-only memory. Appendix C hereto lists the permanently stored instructions needed to decode the coded ADPCM signals in FORTRAN language. Upon detection of a silence code in detector circuit 152, selector 160 connects code generator 155 to adaptive decoder 165. Generator 155 produces C codes equivalent to silence for the interval of time set in the silence count code SCT. The silence interval is timed in silence counter 152. In this manner, the silence intervals are reinserted into the code stream. The sequence of sampled signals from adaptive decoder 165 correspond to the originally encoded speech waveform including silence intervals. The sampled speech signal is converted to analog form via D to A converter 170 and low-pass filter 175 and the speech pattern is produced in transducer 180.

Figure 9:
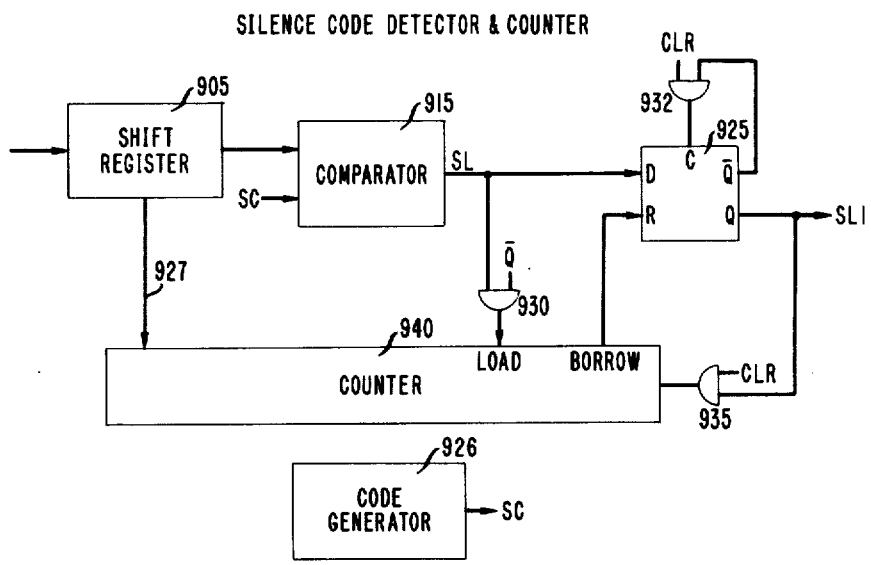
FIG. 9 depicts a detailed block diagram of a silence code detector and counter arrangement useful in the circuit of FIG. 1.

Silence code detector and counter circuit 152 is shown in greater detail in FIG. 9. Referring to FIG. 9, the adaptively coded signal sequence from network 140 is applied to the input of multistage shift register 905. The codes from register 905 are supplied to inputs of comparator 915 in which they are compared to the $87_{16}$ silence codes generated in code generator 920. Upon detection of an $87_{16}$ code from shift register 905, comparator 915 is enabled. Enabled signal SL from comparator 915 alerts AND-gate 930 so that counter 940 is preset to the silence count code on line 927. Enabled signal SL causes flip-flop 925 to be set, and signal SL1 therefrom disconnects line 181 from the input of adaptive decoder 165 and connects silence code generator 155 to the adaptive decoder input. Signal SL1 is also operative to inhibit AND-gate 156 so that FIFO shift register 151 does not provide coded signals during the silence count down. The succeeding clock pulses CLR decrement the count of counter 940 through AND-gate 935 until a zero count is reached. At that time, the borrow output of counter 940 resets silence interval flip-flop 925, and signal SL1 is disabled. Selector 160 now connects line 181 to adaptive decoder 165, and the adaptive code stream from FIFO register 151 is supplied to decoder 165.

Figure 10:
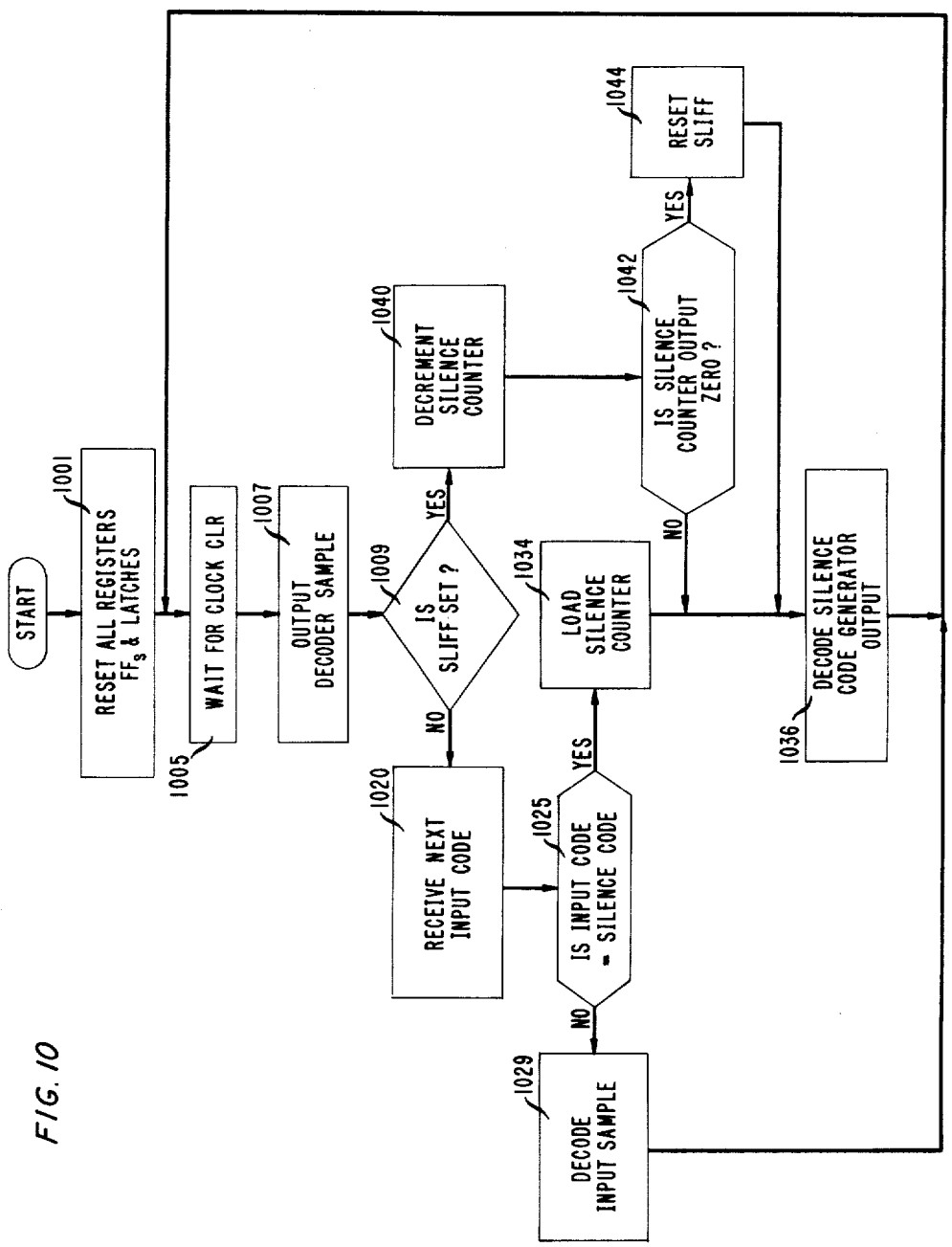
Figure 11:
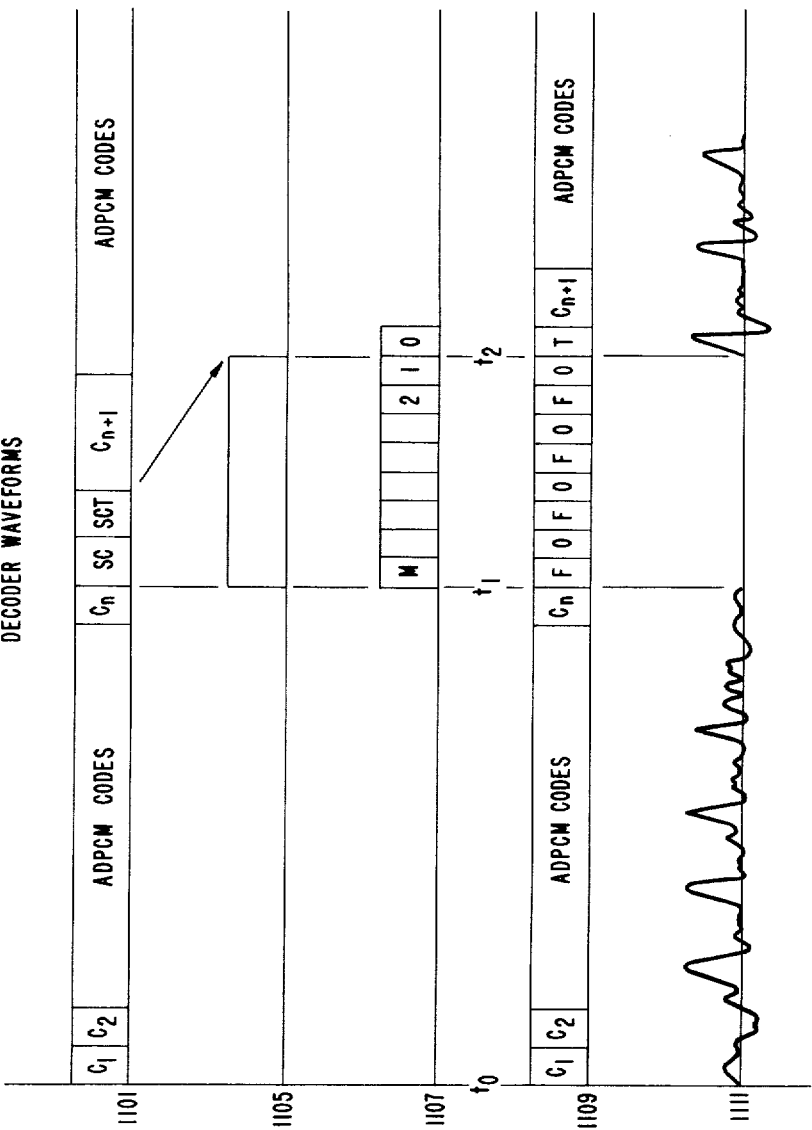

The sequence of operations of decoder circuit 150 is illustrated in the flow chart of FIG. 10 and the waveforms related to the operation are shown in FIG. 11. Waveform 1101 of FIG. 11 illustrates a sequence of adaptive coded signals received from network 140. Between times $T_0$ and $t_1$, adaptive digital codes $C_1$ through $C_n$ are sequentially applied to decoder 150. After code $C_n$, a silence code SC followed by a silence count code SCT appears in the data stream of waveform 1101. These two codes represent a silence interval in the speech signal. Following the silence interval, a sequence of adaptive digital codes beginning with code $C_{n+1}$ appears.

In FIG. 10 the registers, flip-flops, and latches of decoder 150 are initially reset in accordance with operation box 1001. Box 1007 is entered via wait for clock box 1005 at the next clock pulse CLR. Between times $t_0$ and $t_1$ in FIG. 1, speech codes $C_1, C_2 \ldots C_n$ are received from network 140. For each received pulse, an output sample is formed in decoder 165 as per operation box 1007. In decision box 1009, the SL1 signal from flip-flop 925 is inspected (decision box 1009). In the speech interval from $t_0$ to $t_1$, signal SL1 is not set, and the next input code from FIFO 151 is received (box 1020). Since the input code is not the silence code, box 1029 is entered via decision box 1025, and the input sample is decoded.

When time $t_1$ is reached, the input code is the silence code SC. The SC code is detected in comparator 915, and box 1034 is entered via decision box 1025. Counter 940 is loaded with the silence count M (waveform 1107) from shift register 905 as per box 1034. Silence code generator 155 is connected to decoder 165 by enabled signal SL1 (waveform 1105).

Upon the occurrence of the next clock pulse CL, box 1040 is entered via decision box 1009, and the silence counter is decremented in box 1040. The silence count is greater than zero until $t_2$. Consequently, box 1036 is rendered operative through box 1042, and the silence code sequence from generator 155 is applied to decoder 165. At time $t_2$, the silence count is decremented (waveform 1107) to zero and flip-flop 925 is reset as per box 1044 via box 1042. After time $t_2$, normal operation on the input codes is resumed via the path including boxes 1005, 1007, 1009, 1020, 1025, and 1029. The input to decoder 165 illustrated in waveform 1109 includes the silence interval between $t_1$ and $t_2$, which is reconstructed responsive to the SC and silence count codes in waveform 1101.

The invention has been described with reference to a particular embodiment thereof. It is apparent to those skilled in the art that various changes and modifications may be made without departing from the spirit and scope of the invention. For example: the ADPCM encoder and decoder described herein may be replaced by another type of adaptive digital encoding and decoding arrangement known in the art such as adaptive PCM.

APPENDIX A

```
CODER ROUTINE
C         C IS THE ADPCM CODEWORD
C         D IS THE STEP SIZE FROM THE STEP SIZE
          GENERATOR
C         S IS THE SIGNAL INPUT
C         SHAT IS THE RECONSTRUCTED SIGNAL
C         E IS THE DPCM ERROR SIGNAL
C         EHAT IS THE RECONSTRUCTED (QUANTIZED)
          ERROR SIGNAL
C         BETA IS THE PREDICTOR VALUE
      100 READ (1,101)(S)
      101 FORMAT(16)
C         READ INPUT FROM A/D
          SHAT=SHAT-BETA
C         CALCULATE PREDICTOR VALUE FROM SHAT
          E=S-SHAT
C         CALCULATE ERROR SIGNAL
          READ (2.101) (D)
C         GET STEP SIZE
          C=E/D
          IF (C.GT.CMAX) C=CMAX
          IF (C.LT.CMIN) C=CMIN
C         CALCULATE CODEWORD
          WRITE(3.101) (C)
C         OUTPUT CODEWORD
```

```
                EHAT=D-(C+.5)
C               CALCULATE QUANTIZED ERROR SIGNAL
                SHAT=SHAT+EHAT
C               CALCULATE SHAT
                GOTO 100
                END
                     APPENDIX B
                INTEGER OFLAG,NFLAG,DATA
                LONG INTEGER TIME
                NFLAG=0
         10     OFLAG=NFLAG
                READ (1,100) (NFLAG)
        100     FORMAT (12)
                READ (2,110) (DATA)
                IF ( (NFLAG=1) .AND. (OFLAG=1) ) GOTO 20
                IF ( (NFLAG=1) .AND. (OFLAG=0) ) GOTO 30
                IF ( (NFLAG=0) .AND. (OFLAG=1) ) GOTO 40
                WRITE (4,130) (DATA)
                GOTO 10
        110     FORMAT (14)
        130     FORMAT (14)
         20     GOTO 10
         30     GOTO 10
         40     I=087
                WRITE (4,140) (I)
        140     FORMAT (14)
                READ (3,150) (TIME)
        150     FORMAT (112)
                WRITE (4,150) (TIME)
                READ (2,110) (DATA)
                WRITE (4,130) (DATA)
                GOTO 10
                END
C               ALL NUMBERS STARTING WITH A ZERO "0",
                ARE IN OCTAL
C               PORT 1 IS THE SILENCE FLAG PORT,
                INDICATES SILENCE
C               PORT 2 IS THE DATA PORT
C               PORT 3 IS THE SILENCE COUNT PORT
C               PORT 4 IS THE OUTPUT PORT TO MEMORY OR
                THE CHANNEL.
                     APPENDIX C
                DECODER ROUTINE
C               C IS INPUT CODEWORD
C               D IS STEP SIZE FROM STEP SIZE GENERATOR
                SHAT IS THE CODER OUTPUT
                BETA IS THE PREDICTOR VALUE
        100     READ (1,101) (C)
C               GET CODEWORD
                READ (3,101) (D)
C               GET STEP SIZE
                EHAT=D-(C+.5)
C               CALCULATE QUANTIZED VALUE
                SHAT=SHAT-BETA+EHAT
C               CALCULATE RECONSTRUCTED SIGNAL
                WRITE (2,101) (SHAT)
C               WRITE OUT OUTPUT SIGNAL
                GOTO 100
        101     FORMAT (16)
                END
```

What is claimed is:

1. A speech processing system comprising: means for converting a speech pattern into a sequence of adaptive digital coded signals; means for detecting intervals of silence in said speech pattern; means responsive to each detected silence interval for generating a digital coded signal representative thereof; and means for combining said adaptive digital coded signals and said silence interval representative digital coded signals to form a digital signal corresponding to said pattern; said converting means comprising: means for forming a signal corresponding to the adaptation step-size for each adaptive digital coded signal; means for generating first and second threshold signals, said second threshold signal being greater than said first threshold signal; said silence interval detecting means comprising: means responsive to said adaptation step-size corresponding signal diminishing below said first threshold signal for generating a signal indicative of a silence interval; and means jointly responsive to said silence interval signal and said adaptation step-size corresponding signal increasing above said second threshold signal for terminating said silence interval signal.

2. A speech processing system according to claim 1 wherein said silence interval signal generating means comprises: means responsive to said first threshold signal exceeding said step-size corresponding signal for producing a third signal; means responsive to said third signal for initiating said silence interval signal; means responsive to said step-size corresponding signal exceeding said second threshold signal for generating a fourth signal; and means jointly responsive to said silence interval signal and said fourth signal for terminating said silence interval signal.

3. A speech processing system according to claim 2 wherein said means for forming said adaptation step-size corresponding signal comprises means for forming a signal representative of the logarithm of the step-size for each adaptive digitally coded signal.

4. A speech processing system according to claim 1, 2 or 3 wherein said threshold signal generating means comprises: means for generating first and second predetermined level signals; means responsive to the sequence of step-size corresponding signals for producing a signal representative of the maximum step-size corresponding signal in said sequence of step-size corresponding signals; means jointly responsive to said maximum step-size corresponding signal and said predetermined first level signal for producing an adaptive first threshold level signal; and means jointly responsive to said maximum step-size level corresponding signal and said second predetermined level signal for generating an adaptive second threshold level signal.

5. A method for processing speech comprising the steps of: converting a speech pattern into a sequence of adaptive digital coded signals; detecting intervals of silence in said speech pattern; generating a digital coded signal representative of each detected silence interval; and combining said adaptive digital coded signals and said silence interval representative coded signals to form a digital signal representative of the speech pattern; said speech pattern converting step comprising: forming a signal corresponding to the adaptation step-size for each adaptive digital coded signal; generating first and second threshold signals; said second threshold signal being greater than said first threshold signal; and said silence interval detecting step comprising generating a signal indicative of said silence interval responsive to said adaptation step-size corresponding signal diminishing below said first threshold signal and terminating said silence interval signal responsive to said silence threshold signal and said adaptation step-size corresponding signal increasing above said second threshold signal.

6. A method for processing speech according to claim 5 wherein said silence interval signal generating step comprises producing a third signal responsive to said first threshold signal exceeding said step-size corresponding signal; initiating said silence interval responsive to said third signal; generating a fourth signal responsive to said step-size corresponding signal exceeding said second threshold signal; and terminating said silence interval signal jointly responsive to said silence interval signal and said fourth signal.

7. A method for processing speech according to claim 6 wherein forming said adaptation step-size corresponding signal comprises forming a signal representative of the logarithm of the step-size for each adaptive digital coded signal.

8. A method for processing speech according to claims 5, 6 or 7 wherein said threshold signal generating step comprises: generating first and second predetermined level signals; producing a signal representative of the maximum step-size corresponding signal in said sequence of step-size corresponding signals; producing an adaptive first threshold signal jointly responsive to said maximum step-size corresponding signal and said predetermined first level signal; and producing an adaptive second level threshold signal responsive to said maximum step-size corresponding signal and said second predetermined level signal.

9. A voice storage system comprising: means for converting a speech message into a sequence of adaptive digital coded signals; means for detecting intervals of silence in said speech message; means responsive to each detected silence interval for generating a coded signal representative thereof; and means responsive to said adaptive digital coded signals and said silence interval coded signals for storing a digital coded signal sequence representative of said speech message; said converting means comprises; means for forming a signal corresponding to the adaptive step-size for each adaptive digital coded signal; and said silence interval detecting means comprises means for generating first and second threshold signals, said second threshold signal being greater than said first threshold signal; means responsive to said adaptive step-size corresponding signal being less than said first threshold signal for initiating a signal indicative of a silence interval; and means responsive to said silence interval signal and said adaptive step-size signal exceeding said second threshold signal for terminating said silence interval signal.

10. A voice storage system according to claim 9 wherein said means for forming said adaptive step-size corresponding signal comprises means for generating a signal representative of the logarithm of said adaptive step-size signal.

11. A voice storage system according to claim 9 wherein said first and second threshold signal generating means includes: means for generating first and second predetermined level signals; means for selecting the maximum adaptive step-size corresponding signal in the sequence of adaptive step-size corresponding signals at the occurrence of each adaptive digital coded signal; means responsive to the first predetermined level signal and said selected maximum adaptive step-size corresponding signal for generating an adaptive first threshold signal; and means jointly responsive to said second predetermined level signal and said selected maximum adaptive step-size corresponding signal for generating an adaptive second threshold signal.

12. A voice storage system according to claim 9, claim 10 or claim 11 furhher comprising means responsive to said stored digital code sequence for constructing a speech pattern corresponding to said speech message.

13. A voice storage method comprising the steps of: converting a speech message into a sequence of adaptive digital coded signals; detecting intervals of silence in said speech message; generating a coded signal representative of each detected silence interval; storing a digital coded signal representative of the speech message responsive to said adaptive digital coded signals and said silence interval representative signals; said converting step comprising forming a signal corresponding to the adaptive step-size for each adaptive digital coded signal; and said silence interval detecting step comprising: generating first and second threshold signals, said second threshold signal being greater than said first threshold signal; initiating a signal indicative of a silence interval responsive to said adaptive step-size signal diminishing below said first threshold signals; and terminating the silence interval signal responsive to said silence interval signal and the adaptive step-size signal exceeding said second threshold signal.

14. A voice storage method according to claim 13 wherein the forming of said adaptive step-size corresponding signal comprises forming a signal representative of the logarithm of the adaptive step-size signal.

15. A voice storage method according to claim 13 or claim 14 wherein said first and second threshold signal generating step comprises: generating first and second predetermined level signals; said second predetermined level signal being greater than said first predetermined level signal; selecting the maximum adaptive step-size corresponding signal in the sequence of adaptive step-size corresponding signals at the occurrence of each adaptive digital coded signal; generating a first adaptive threshold signal responsive to the selected maximum step-size signal and said first predetermined level signal; and generating a second adaptive threshold signal response to said selected maximum adaptive step-size signal and said second predetermined level signal.

* * * * *